Dec. 20, 1966  W. RECKNAGEL  3,292,453
LITHO PRINTING MACHINE
Filed April 26, 1965  4 Sheets-Sheet 1

Inventor:
Werner Recknagel
By Wenderoth, Lind and Ponack
Attys

United States Patent Office 3,292,453
Patented Dec. 20, 1966

3,292,453
LITHO PRINTING MACHINE
Werner Recknagel, Gottschedstrasse 36, Berlin, Germany
Filed Apr. 26, 1965, Ser. No. 450,756
Claims priority, application Germany, May 8, 1964,
R 37,852
4 Claims. (Cl. 74—625)

This invention relates to a litho printing machine, particularly an offset printing machine.

The invention is embodied in a litho printing machine comprising manual and motor drive means, wherein optionally either the manual drive (a hand crank) or the motor drive can be engaged with or disengaged from driven members of the machine by clutch means, axial displacement of the hub of the hand crank causing the hand crank to be disengaged from the driven members of the machine and the motor to be coupled with the driven members of the machine by actuating means, whereas rotation of the hub of the hand crank causes said actuating means to disengage the motor from said driven members and the hand crank to be coupled therewith instead.

In litho printing machines of the above kind, it is known to use a dog clutch for engaging or disengaging the motor which runs continuously. Whenever the motor drive is engaged this clutch causes a sudden jolt which may give rise to the appearance of a smeary band on the print which spoils a number of copies.

The object of the present invention is to provide clutch means which have a smooth action when the actuating means are operated for engaging the motor drive. According to the invention the clutch means for engaging and disengaging the motor drive is constituted by a torsion spring clutch comprising a torsion spring of a helix diameter sufficient to provide clearance between the spring and the peripheral surface of one member of the torsion spring clutch and for engagement of the torsion spring clutch the actuating means for engaging the motor cause brake means to act on the torsion spring rotating with the other member of the clutch in such manner as to tighten the torsion spring on the peripheral surface of the first mentioned member of the clutch and thus to engage the torsion spring clutch. Conveniently the torsion spring is so designed that the outer periphery of the spring is compressed within a sleeve of the brake means, the free end of the spring being attached to the sleeve. The invention thus provides a torsion spring clutch in which the torsion spring normally clears the co-operating part of the clutch on the input shaft and is thus disengaged. This ensures that the crank handle is disengaged from the motor drive.

Litho printing machines are already known in which torsion spring clutches are used for optionally coupling the machine to a drive shaft. However, in these torsion spring drives a helical spring is directly mounted on the input shaft of the machine and its convolutions embrace the shaft end of the motor or of a part geared to the motor and tighten on the shaft end as soon as the motor is started. However, since these machines also have a crank handle for manual operation the crank handle must also be disengageable from the input shaft of the machine because it would otherwise rotate when the machine is motor driven and it would then be a danger to the machine minding personnel. In order to save this additional clutch and also in order to eliminate the accident risk involved in the possibility of the clutches being wrongly operated, it has been proposed to replace the hand crank by a handwheel which in the absence of a clutch for the hand crank continuously participates in rotation. Although this may reduce the accident hazard it also makes the operation of manually rotating the impression cylinder backwards and forwards much more inconvenient, particularly because the stationary motor must also be turned to and fro and considerable effort is needed to do so.

An exemplary embodiment of a litho printing machine incorporating the invention will be described by reference to the accompanying drawings in which.

Figure 1:
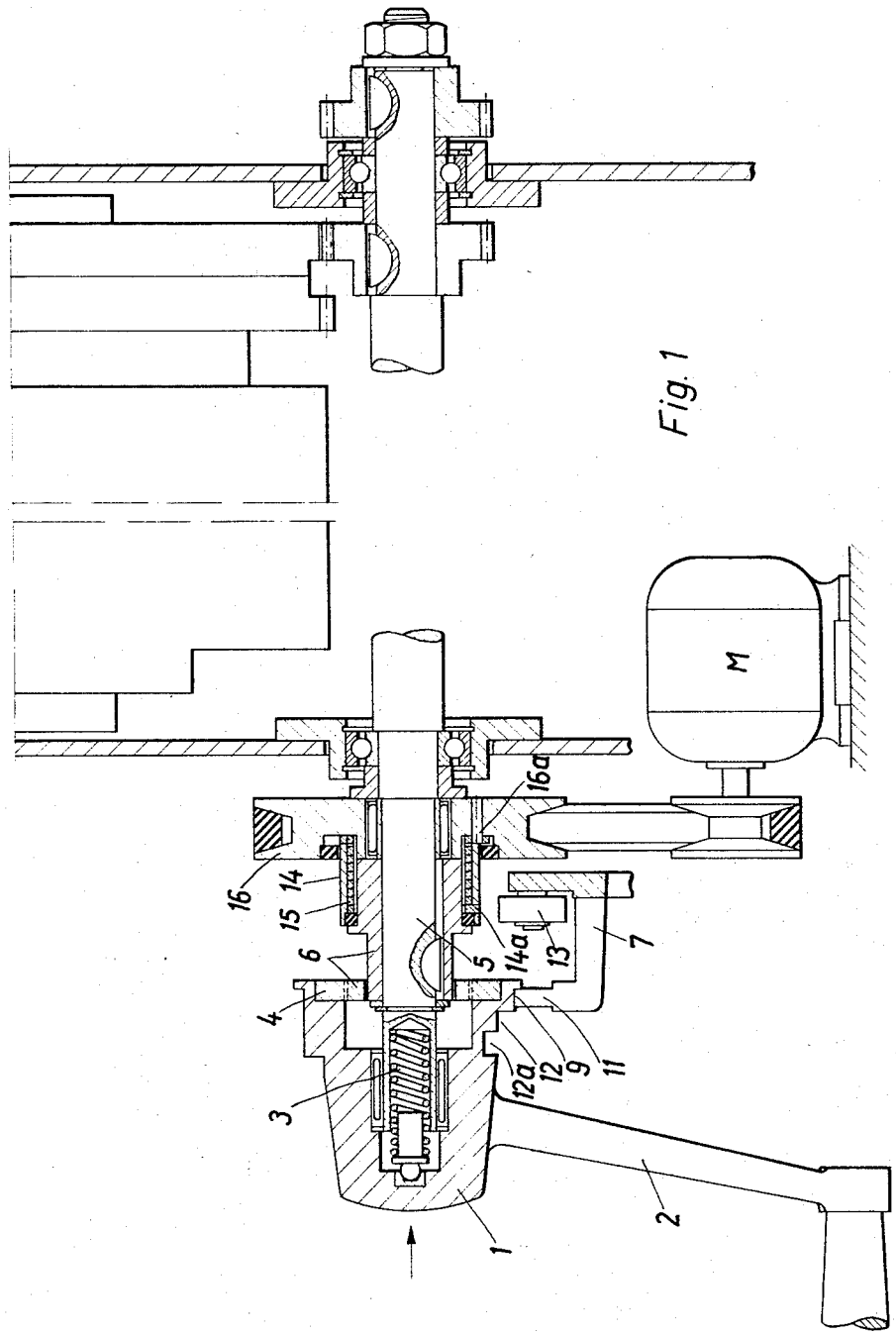
FIG. 1 is a schematic side elevation of the embodiment, showing the hand crank engaged.
Figure 2:
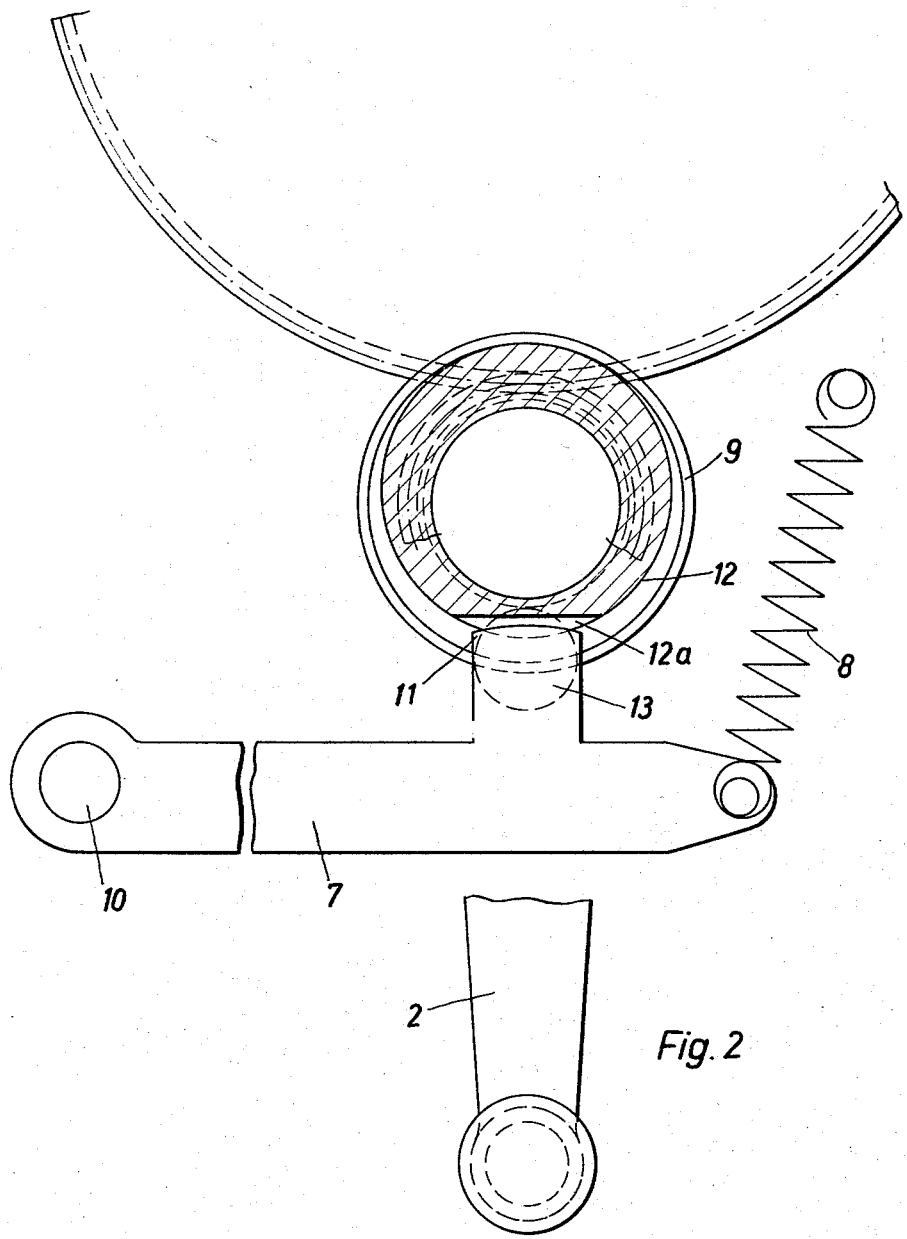
FIG. 2 is a part sectional front elevation of the embodiment.

Referring to FIGURE 1, there is shown a portion of a litho printing machine having a machine input shaft 5 which drives the impression cylinder as schematically indicated.

Manual drive means for the shaft 5 comprises a hand crank 2, the hub 1 of which is rotatably supported and axially slidable on the outer end of input shaft 5. Motor drive means for the shaft 5 includes a pulley 16a driven by a motor M. A clutch member 6 is secured to the input shaft 5, such as by a key as shown. A manual clutch member 4 or a motor clutch member 15 is adapted to be selectively engaged with the clutch member 6 to rotate the input shaft 5 and hence the impression cylinder as will be explained below. The motor clutch includes a torsion spring 15 secured at one end to the pulley 16 at 16a and of a diameter sufficient to provide clearance between itself and the adjacent peripheral surface of the clutch member 6 in the absence of any restraining force acting on the other end of the spring 15 which is secured at 14a to a sleeve 14 enclosing the spring and in contact with the outer surfaces of the spring.

The position of the parts in FIGURE 1 illustrates the machine with the hand crank in engagement, the motor drive being disengaged, although the motor M and the members 14, 15 and 16 continue to revolve. For the change over from manual operation to motor drive the hub 1 of the hand crank 2 must be pushed in the arrowed direction whilst the hand crank 2 is in position of rest hanging vertically downwards. Member 4 of the clutch is thus pushed axially to the right against the resistance of a spring 3 into the position shown in FIG. 4 and it is thereby moved out of engagement with the co-operating member 6 of the clutch which is fast on the input shaft 5 of the machine. A lever 7 which is loaded by a spring 8 has a cam 11 which now rides off a supporting track 9 on the axially displaced hub 1. The lever therefore flips upwards about its pivot at 10. A follower 11 on lever 7 which can be seen in FIGS. 1 to 4 snaps into a recessed part 12a of an eccentric track 12 on hub 1 and thereby prevents the crank 2 from being restored to its former position by spring 3. The ascending arm of lever 7 carries a roller 13 which therefore now moves into contact with the sleeve 14. Sleeve 14 enclosing the torsion spring 15.

The pressure of the roller 13, which has a resilient peripheral jacket, on sleeve 14 brakes the sleeve sufficiently to hold back the end of spring 15 that is attached to the sleeve at 14a and causes the spring 15 to twist itself tightly on to member 6 of the clutch which is firmly connected to the input shaft of the machine, and thus to transmit torque for starting up the printing cylinders.

Figure 3:
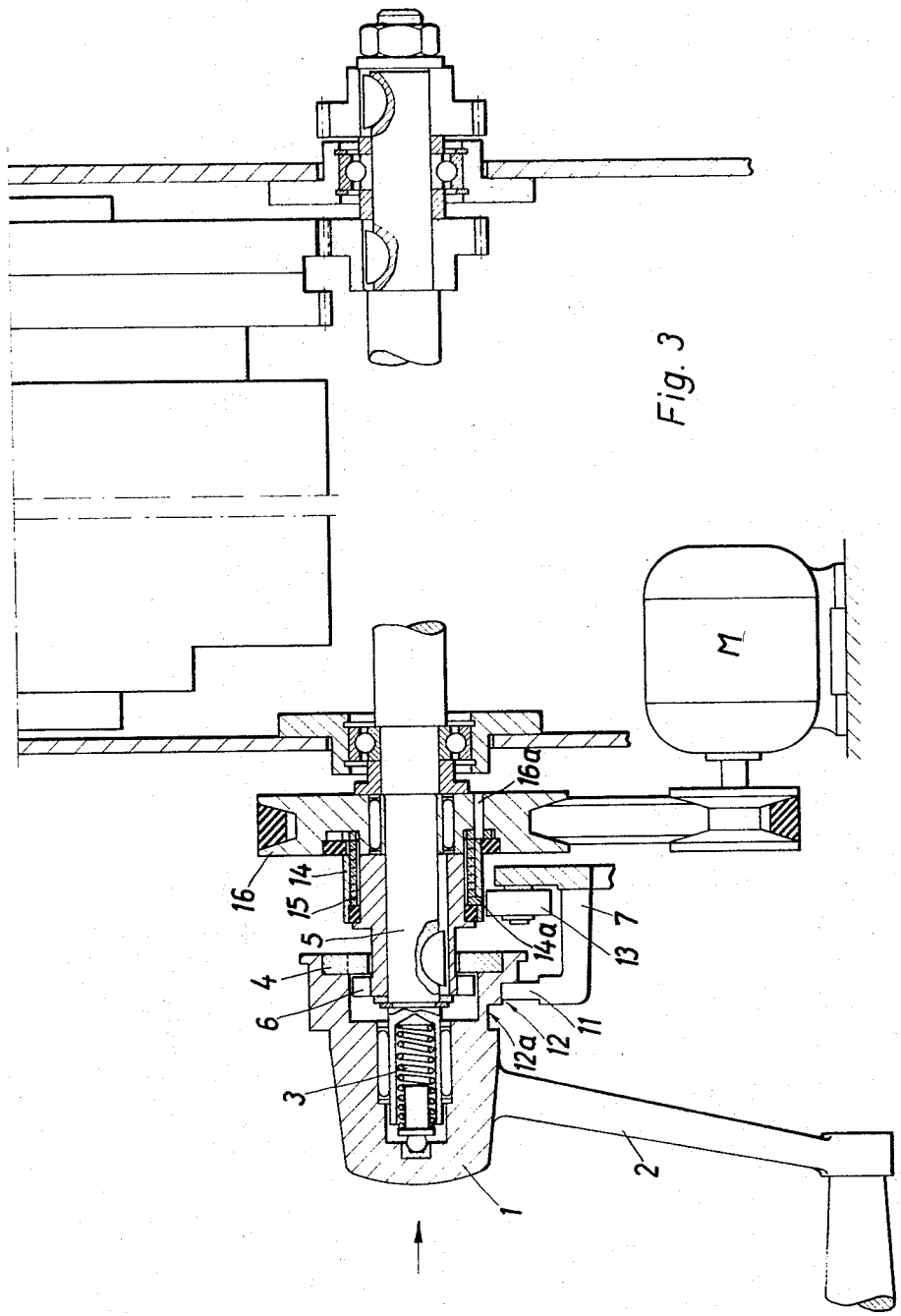
FIG. 3 is a schematic side elevation of the embodiment, the hand crank being in neutral position.
Figure 4:
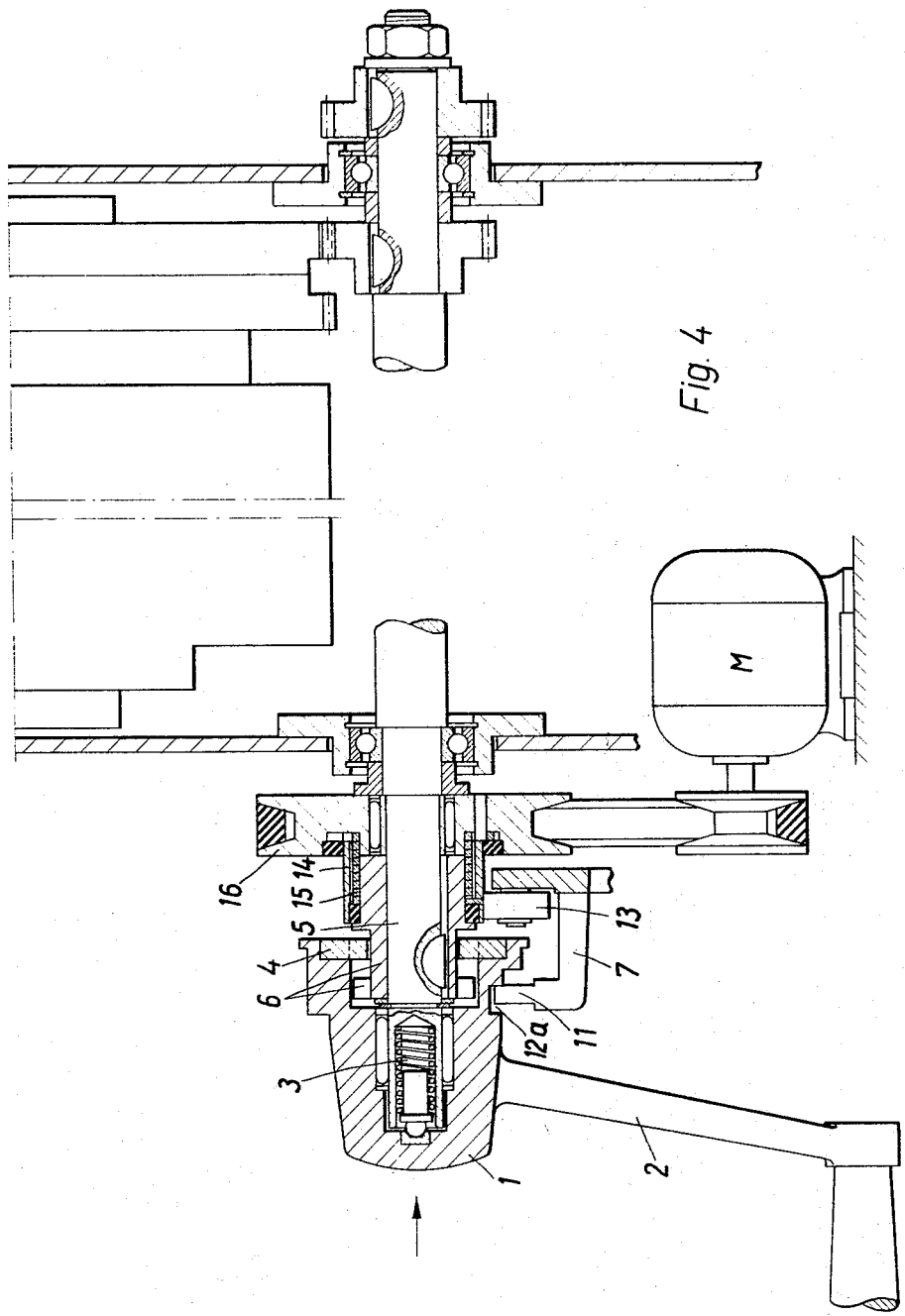
FIG. 4 is a schematic side elevation of the embodiment, showing the motor drive in engagement.

When it is desired to disconnect the motor drive, i.e., to disengage the clutch, the hand crank 2 must be turned in either direction far enough for the recessed portion 12a to depress the follower 11 into a position in which spring 3 (FIGS. 1, 3, 4), can restore the hub 1 together with the crank 2 across the follower 11 and the latter to ride on to the track marked 12. This is illustrated in FIG. 3 and establishes the neutral position of the hand crank 2 in which the crank is disengaged both from the motor M and from the input shaft of the machine. Since in this position roller 13 is withdrawn from sleeve 14, spring 15 releases member 6 of the clutch and drive thus ceases to be transmitted to the input shaft 5 of the machine.

If the hand crank 2 is now rotated further to the right or left the eccentric track 12 (FIG. 2) will further depress cam 11 and hence lever 1 until spring 3 is able to push the hub 1 together with the crank 2 transversely across the cam which then rides on to the concentric track 9. In this position it prevents the motor M from being re-engaged by the thrust of roller 13 even if the hand crank 2 continues to be rotated.

This is the position illustrated in FIGURE 1. It is the position in which the input shaft can be turned manually by means of the crank. In other words, whilst the motor drive remains disengaged, clutch member 4 engages clutch member 6 so that rotation of the crank 2 entrains the machine input shaft 5 and hence the impression cylinder.

If it is now desired to re-engage the motor M, the hub 1 together with the crank 2 can be pushed to the right again, as hereinabove already described.

It will be appreciated by those skilled in the art that other embodiments are possible without departing from the spirit and scope of the invention.

I claim:
1. In a litho printing machine having a driven member, manual drive means for said driven member and motor drive means for said driven member, clutch means for engaging and disengaging said motor drive means from said driven member comprising a clutch member drivingly secured to said driven member, a torsion clutch spring surrounding said clutch member and having a helix diameter which is sufficient to provide clearance between said spring and said clutch member in disengaged condition of said clutch spring, means connecting said clutch spring for rotation by said motor, and actuating means movable into engagement with said clutch spring to brake rotation of said clutch spring and cause said clutch spring to tighten onto said clutch member to rotate said clutch member.

2. The subject matter according to claim 1 further comprising a sleeve enclosing said clutch spring and to which the free end of said clutch spring is secured.

3. A litho printing machine comprising a driven member, manual drive means for said driven member comprising a hand crank and manual clutch means which engages said hand crank with said driven member and is disengaged by axial displacement of the hub of said hand crank, motor drive means for said driven member and motor clutch means for engaging and disengaging said motor drive means with said driven member, said motor clutch means comprising torsion spring clutch means including a torsion spring of a helix diameter sufficient to provide clearance between the spring and the peripheral surface of one member of the torsion spring clutch means, actuating means rendered operable upon axial movement of said hub of said hand crank to brake said torsion spring rotating with the other member of the torsion spring clutch means and cause said torsion spring to tighten on the peripheral surface of said first mentioned member of said torsion spring clutch means and thus to engage said torsion spring clutch, and means conditioned by rotation of said hand crank to render said actuating means inoperable and to engage said manual clutch means.

4. The machine according to claim 3 further comprising a sleeve enclosing said clutch spring and to which the free end of said clutch spring is secured, said actuating means being rendered operable to brake said sleeve.

References Cited by the Examiner

UNITED STATES PATENTS

| | | | |
|---|---|---|---|
| 1,813,095 | 7/1931 | Starkey et al. | 74—625 |
| 2,480,507 | 8/1949 | Pepper. | |
| 2,621,540 | 12/1952 | Rath | 74—626 |
| 2,693,718 | 11/1954 | Gericke | 74—625 |

FRED C. MATTERN, JR., *Primary Examiner.*

W. S. RATLIFF, *Assistant Examiner.*